United States Patent [19]

Komakine

[11] 3,973,054
[45] Aug. 3, 1976

[54] FEEDSTUFF FOR FOWL, FISH AND DOMESTIC ANIMALS

[76] Inventor: Chukei Komakine, 13-10, Aza Sugidaira, Taira, Dwaki, Fukushima, Japan

[22] Filed: Apr. 21, 1975

[21] Appl. No.: 569,848

[52] U.S. Cl. ............................... 426/641; 426/807
[51] Int. Cl.² ......................................... A23K 1/175
[58] Field of Search ............ 426/74, 644, 641, 643, 426/646, 520, 521, 805, 807; 4/187; 424/76

[56] References Cited
UNITED STATES PATENTS

| | | | |
|---|---|---|---|
| 2,019,547 | 11/1935 | Theobald | 426/807 |
| 3,836,676 | 9/1974 | Komakine | 426/807 |

Primary Examiner—A. Louis Monacell
Assistant Examiner—R. B. Penland
Attorney, Agent, or Firm—Flynn & Frishauf

[57] ABSTRACT

An odorless composition useful as a feedstuff for fowl, fish and domestic animals substantially consisting of a dried mixture of 100 weight parts of crude droppings from fowl, 30 to 40 weight parts of waste cut portions of fowl, fish and domestic animals produced after flesh-cutting, and about 10 weight parts of coarse powder of crystalline ferrous sulfate hepta-hydrate, wherein said mixture has been steamed hermetically under a pressure of about 3 kg/cm² and a temperature of about 300°C for about 2 hours.

4 Claims, No Drawings

FEEDSTUFF FOR FOWL, FISH AND DOMESTIC ANIMALS

This invention relates to a feedstuff for fowl, fish and domestic animals.

Recently, a waste, such as heads, feet, legs, tails, entrails, feathers, bones and useless flesh, which is discarded after removal of useful flesh from fowl, fish or domestic animals, begins to be used as a feedstuff after they have been treated by subjection to steaming in an autoclave equipped with a stirrer, under a gauge pressure of 2 to 3 kg/cm² and a temperature of 250° to 300°C for 2 to 3 hours. The steamed waste changes into coarse powders of about 50 Tyler mesh in the autoclave by hydrolysis, giving forth offensive odor. The coarse powder, when taken from the autoclave, becomes naturally a dried state having water content of less than 10% by weight. The dired powder can be used as a feedstuff for fowl, fish or domestic animals which is generally called as "feather meal", but its offensive odor is detested.

Furthermore, such a so-called feather meal is not a preferable feedstuff practically, because it contains too much fatty matter of about 17% by weight. Therefore, it is necessary to remove part of fatty matters from the unsteamed waste beforehand in order to reduce the content of fatty matter in the feather meal to be 6 to 7% by weight. This defatting process is very troublesome.

On the other hand, an odorless feedstuff for fowl, fish and domestic animals was discovered by the present inventor. (See U.S Pat. No. 3,836,676. ) This feedstuff consists essentially of a dried mixture of crude droppings from fowl, coarse powder of crystalline ferrous sulfate hepta-hydrate and a finely powdered adsorbent of fly ash or zeolite containing about 7% by weight of said ferrous sulfate and about 3.5% by weight of said adsorbent based on the weight of said crude droppings from fowl.

However, this novel feedstuff contains too little an amount of fatty matter, that is, less than 2% by weight, whereas general feedstuffs should contain at least 4,% preferably 6 to 7% by weight of fatty matter. Accordingly, when the feedstuff of said U.S. patent is mixed with general feedstuffs, it is not preferable to mix 100 weight parts of general feedstuffs with more than 20 weight parts of said U.S. patent feedstuff, because the content ratio of fatty matters in the mixed feedstuff would be reduced remarkably. Especially, in the case of broiler production, the flesh gainings would be reduced when the mixing ratio of said U.S. patent feedstuff to general feedstuffs is more than 10 weight parts of the former per 100 weight parts of the latter.

An object of this invention is to provide an excellent feedstuff using waste animal materials.

Another object of this invention is to provide a novel feedstuff containing a favorable amount of fatty matters and having substantially no offensive odor.

These objects can be attained in accordance with the method of this invention which comprises mixing together 100 weight parts of crude droppings from fowl, about 30 to 40 weight parts of waste portions of fowl, fish and domestic animals removed after flesh-cutting and about 10 weight parts of coarse powder of ferrous sulfate hepta-hydrate, wherein said waste portions of fowl, fish and domestic animals are cut finely in advance, and steaming the mixture in an autoclave equipped with a stirrer under a gauge pressure of 2 to 3 kg/cm² and a temperature of 250° to 300°C for 1 to 2 hours.

The content of fatty matter in the feedstuff prepared by the method of this invention is 6 to 7% by weight, and this feedstuff is substantially odorless on account of the deodorizing effect produced by ferrous sulfate hepta-hydrate added. Therefore, this feedstuff may be used by itself favorably. However, it is preferable to mix this feedstuff with the almost same amount of general feedstuff, because the latter general feedstuffs contain small amounts of various effective ingredients and have a liking taste for fowl, fish or domestic animals.

Since the large crystals of ferrous sulfate hepta-hydrate, which are a useless by-product in the titanium white manufacturing industry, have a hygroscopic nature, crushing and dusting of this material can not be easily carried out. Further, when this material is let stand in the atmosphere, the surface of the crystals is gradually converted into yellowish brown iron hydroxysulfate, and the above-mentioned deodorizing effect may be decreased. It was found, as seen in the aforementioned U.S. patent specification, that inconvenience in handling and instability of this material is remedied by adding fly ash or finely pulverized zeolite powder thereto. That is to say, a composition, which is obtained by mixing coarse powder of the industrial crystalline ferrous sulfate hepta-hydrate with about a half amount by weight of fly ash or fine powder (100 to 150 Tyler mesh) of dried zeolite, followed by drying at a temperature of 60° to 80°C, is non-hygroscopic and stable against decomposition. Since the particles thereof are self-lubricated, it is satisfactory in efficacy and convenient in handling when the mixed composition is used as the deodorizer. This deodorizer composition, especially for use in the poultry farming, has been already patented. (See U.S. Pat. No. 3,898,324 issued on Aug. 5, 1975.

In a large-scaled industrial practice, it is better to divide the main step of this invented method into two main processes. The one main process comprises respectively forming a layer of the above-mentioned deodorizer of U.S. Pat. No. 3,898,324 on the dropping floor of poultry coops so that the poultry drop their excrement on the layer of said mixture; and collecting from the poultry coop the mixture of the droppings with said deodorizer for transport to a feedstuff manufacturing plant when the amount of dropings becomes about ten times that of ferrous sulfate hepta-hydrate in said deodorizer based on the weight.

The other main process will be carried out in the feedstuff manufacturing plant. One hundred parts by weight of the mixed droppings from fowl containing about 7 parts by weight of coarse powder of crystalline ferrous sulfate hepta-hydrate and about 3.5 parts by weight of fly ash or finely powdered zeolite is charged into an autoclave equipped with a stirrer together with about 30 to 40 parts by weight of waste cut portions of fowl, fish and domestic animals removed after flesh-cutting. Then, the content of the autoclave is steamed hermetically under a gauge pressure of 2 to 3 kg/cm² and a temperature of 250° to 300°C for about 2 hours. When the autoclave is opened and its content is cooled in an atmospheric pressure, drying of the product is naturally carried out without producing an offensive odor substantially, to obtain a final product of excellent feedstuff with the water content of less than 10% by weight.

As mentioned before, the feedstuff of U.S. Pat. No. 3,836,676 should be used in the mixing ratio of 10 to 20% by weight based on the weight of general feedstuff. Therefore, where a poultry farming is running on the large scale, about a half amount of crude droppings can be utilized as a raw material for feedstuff, and the remaining part thereof should be used for fertilizer manufacturing. According to this invention, on the contrary, all of the crude droppings can be utilized as raw material for the feedstuff, because the mixing ratio of the present feedstuff to general ones is about 50 to 50. Therefore, in a large-scaled poultry farming, associated with broiler manufacturing, keeping, for example, fifty thousands to five hundred thousands fowls, it is possible to run a poultry farming rationally and economically without generation of any offensive odor, by-product and waste substance.

For reference, the content of crude protein in the feedstuff of this invention is about 42 to 44% by weight, whereas about 18 to 20% by weight in general feedstuff, about 2.2 to 2.3% by weight in the feedstuff of U.S. Pat. No. 3,836,676, and 57 to 60% by weight in a non-defatted feather meal.

The following example illustrates the practice of this invention.

In a poultry farm of 50,000 fowls capacity, a layer of the deodorizer of U.S. Pat. No. 3,898,324 was formed repetitively on the dropping floor of poultry coop so that the fowls drop their excrement on the layer of the deodorizer, which was prepared in advance by mixing coarse powder of by-product crystalline ferrous sulfate hepta-hydrate with a half amount by weight of fly ash, followed by drying at a temperature of about 80°C for 1 hour. The droppings mixed with the deodorizer were collected from the poultry coop when the amount of droppings became about ten times that of the ferrous sulfate hepta-hydrate in said deodorizer based on the weight. Then the collected droppings mixed with the deodorizer were sent to a feedstuff manufacturing plant.

On the other hand, all of waste parts of fowls sent from a broiler-flesh making plant in this poultry farm were mixed together to be cut finely.

One hundred parts by weight of the afore-mentioned collected droppings were mixed with 35 parts by weight of the above-mentioned cut waste, followed by steaming the mixture in an autoclave equipped with a stirrer, under a gauge pressure of 2.5 kg/cm² and a temperature of 300°C for two hours.

Upon opening the autoclave, there was obtained a coarse powder of yellowish, substantially odorless feedstuff, whose compositions were as follows.

|  | wt. % |
|---|---|
| Crude protein | 43.88 |
| Crude fatty matters | 6.46 |
| Crude fibrous matters | 6.18 |
| Ash | 26.58 |
| Soluble matters containing no nitrogen | 7.15 |

-continued

|  | wt. % |
|---|---|
| Water | 9.75 |
| Total | 100.00 |

For reference, the compositions of the so-called feather meal, prepared under the same condition as mentioned above using the waste from broiler-flesh making plant alone, were as follows.

|  | wt. % |
|---|---|
| Crude protein | 57.34 |
| Crude fatty matters | 17.39 |
| Crude fibrous matters | 1.16 |
| Ash | 16.54 |
| Soluble matters containing no nitrogen | 0.01 |
| Water | 7.56 |
| Total | 100.00 |

Fifty thousand fowls were raised in this poultry farm using a mixed feedstuff which consisted of a commercially available feedstuff and the above-mentioned one of this invention, the mixing ratio being 50-50, for a long time. However, any hindrance or loss did not occur during this long time, as compared to the case of using only the commercially available feedstuff.

What is claimed is:

1. A method of producing an odorless feedstuff for fowl, fish and domestic animals comprising mixing 100 parts by weight of crude droppings from fowl, 30 to 40 parts by weight of waste portions of fowl, fish and domestic animals which remain after removal of useful meat, and about 10 parts by weight of coarse powder of crystalline ferrous sulfate hepta-hydrate; steaming and agitating the mixture under a gauge pressure of 2 to 3 kg/cm² and a temperature of 250° to 300°C for 1 to 2 hours; and cooling the steamed mixture at atmospheric pressure to produce said odorless feedstuff.

2. The method of claim 1 wherein said 30 to 40 parts by weight of waste portions consist of waste portions of fowl.

3. A method of producing an odorless feedstuff for fowl, fish and domestic animals comprising mixing 100 parts by weight of crude droppings from fowl, about 7 parts by weight of coarse powder of crystalline ferrous sulfate hepta-hydrate, about 3.5 parts by weight of absorbent selected from the group consisting of fly ash and zeolite, and 30 to 40 parts by weight of waste portions of fowl, fish and domestic animals which remain after removal of useful meat; steaming and agitating the mixture under a gauge pressure of 2 to 3 kg/cm² and a temperature of 250° to 300°C for 1 to 2 hours; and cooling the steamed mixture at atmospheric pressure to produce said odorless feedstuff.

4. The method of claim 3 wherein said 30 to 40 parts by weight of waste portions consist of waste portions of fowl.

* * * * *